US007218463B1

(12) United States Patent
Arsenault

(10) Patent No.: US 7,218,463 B1
(45) Date of Patent: May 15, 2007

(54) MAGNIFYING ASSEMBLY

(76) Inventor: Jerry J. Arsenault, P.O. Box 467, 29 Elizabeth Rd., Sandown, NH (US) 03873

(*) Notice: Subject to any disclaimer, the term of this patent is extended or adjusted under 35 U.S.C. 154(b) by 146 days.

(21) Appl. No.: 11/041,034

(22) Filed: Jan. 24, 2005

(51) Int. Cl.
*G02B 7/02* (2006.01)
*G02B 27/02* (2006.01)

(52) U.S. Cl. ....................... 359/817; 359/802; 359/803

(58) Field of Classification Search ................. 359/817
See application file for complete search history.

(56) References Cited

U.S. PATENT DOCUMENTS

| | | | | |
|---|---|---|---|---|
| 4,796,162 A | | 1/1989 | Krogsrud | 362/33 |
| 4,958,913 A | | 9/1990 | Schaffer | 359/819 |
| 5,048,928 A | * | 9/1991 | Davis | 359/809 |
| 5,113,289 A | | 5/1992 | Soper | 359/811 |
| 5,493,451 A | * | 2/1996 | Cosey, Sr. | 359/817 |
| D382,577 S | | 8/1997 | Waldmann | D16/135 |
| 5,754,349 A | * | 5/1998 | Hon | 359/813 |
| 5,847,883 A | | 12/1998 | Rispoli, Sr. | 359/802 |
| 5,926,315 A | | 7/1999 | McBride | 359/534 |
| 6,253,459 B1 | * | 7/2001 | Barnhill | 33/514.1 |
| 6,989,948 B2 | * | 1/2006 | Hussaini et al. | 359/809 |
| 2003/0089832 A1 | * | 5/2003 | Gold | 248/454 |

* cited by examiner

*Primary Examiner*—Jordan Schwartz
*Assistant Examiner*—Jessica Stultz

(57) ABSTRACT

A magnifying assembly includes a plate with a first side, a second side, a first end and a second end. The plate is mountable to a planar surface. A panel has a first edge, a second edge, a third edge, and a fourth edge wherein the first and second edges are positioned opposite of each other. The panel has a centrally disposed window extending therethrough. A pair of wells extends into the third edge. A magnifying lens is mounted to a peripheral edge of the window. Each of a pair of arms has an inner end positioned within one of the wells. The outer ends of the arms are each hingedly coupled to the first end of the plate. The panel is selectively abuttable against the plate when the arms are fully extended into the wells. The magnifying lens may be selectively pivoted and extended outwardly away from the plate.

15 Claims, 5 Drawing Sheets

MAGNIFYING ASSEMBLY

BACKGROUND OF THE INVENTION

1. Field of the Invention

The present invention relates to magnifying devices and more particularly pertains to a new magnifying device that may be positioned in a convenient location for reading medication labels and the like.

2. Description of the Prior Art

The use of magnifying devices is known in the prior art. U.S. Pat. No. 5,113,289 describes a housing that is attachable to the bottom of a shelf. A magnifying glass is removably extendable into the housing and may be extended outwardly away from the shelf so that it may be used. Another type of magnifying device is U.S. Pat. No. 4,796,162 which includes a magnifying glass that is attached to an articulated arm assembly. A clamp is attached to the arm so that the arm may be positioned on the edge of a table or cabinet. Yet another such device is found in U.S. Pat. No. 5,847,883 and includes a clamp to which a magnifying lens is attached.

While these devices fulfill their respective, particular objectives and requirements, the need remains for a device that includes a magnifying lens that may be folded up against a wall or under a counter and which includes an internal lighting system for viewing an item being magnified. Such a device may be positioned in places where required most such as adjacent to a food cabinet for reading food labels or in or near a medicine cabinet for reading medicine bottle labels.

SUMMARY OF THE INVENTION

The present invention meets the needs presented above by generally comprising a plate that has a first side, a second side, a first end and a second end. The plate is removably mountable to a planar surface. A panel has a first edge, a second edge, a third edge and a fourth edge wherein the first and second edges are positioned opposite with respect to each other. The panel has a centrally disposed window extending therethrough. A pair of wells extends into the third edge. Each of the wells is positioned adjacent to and extends along one of the first and second edges. A magnifying lens is mounted to a peripheral edge of the window. Each of a pair of arms has an inner end and an outer end. The inner ends are each positioned within one of the wells. Each of the inner ends is selectively positionable adjacent to a back wall of the wells to define a stored position or adjacent to the third edge to define an extended position. The outer ends of the arms are each hingedly coupled to the first end of the plate. The panel is selectively abuttable against the plate when the arms are in the stored position. The magnifying lens may be selectively pivoted and extended outwardly away from the plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
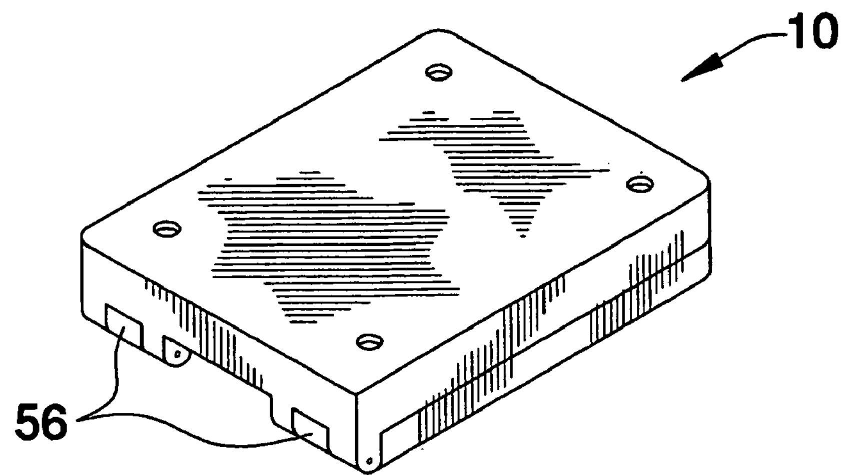
FIG. 1 is a perspective view of a magnifying assembly according to the present invention.
Figure 2:
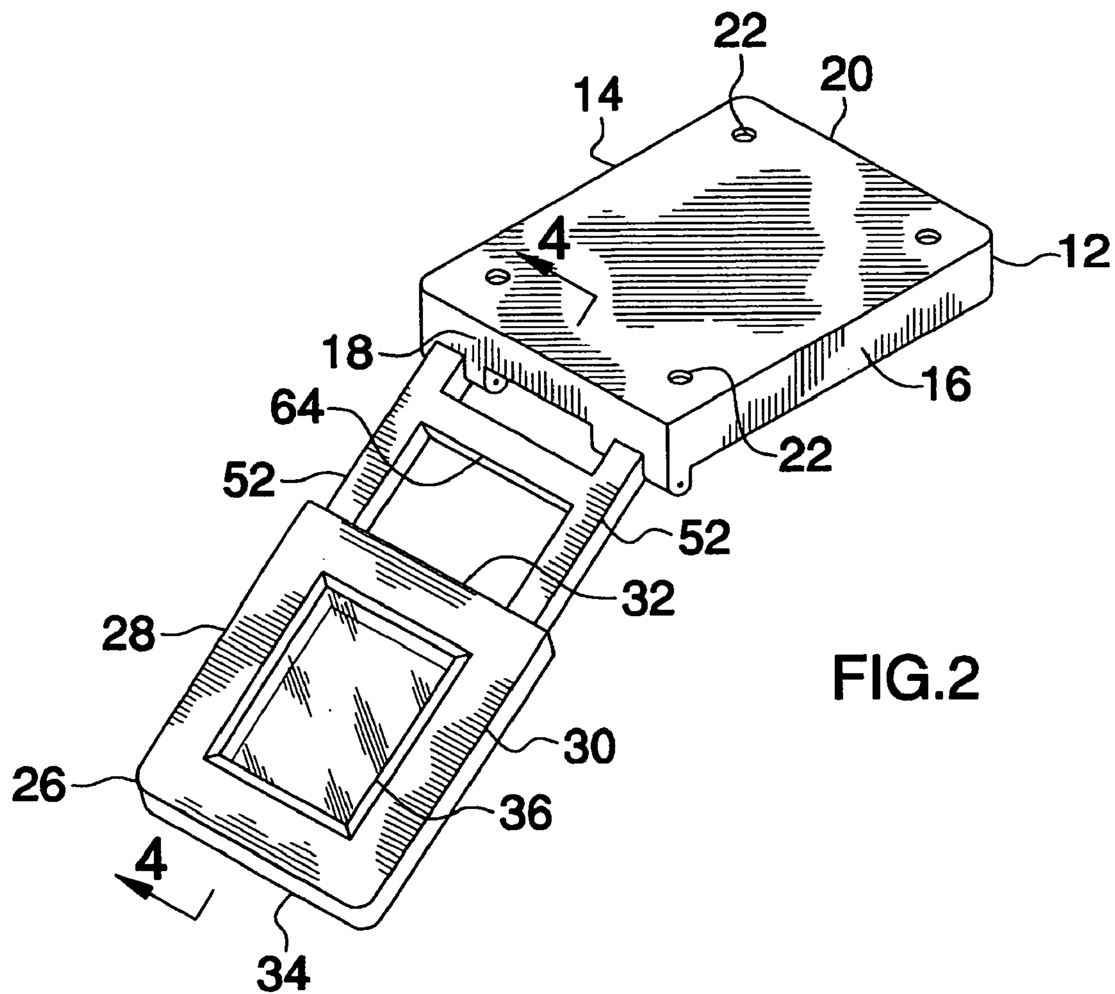
FIG. 2 is a perspective view of the present invention.
Figure 3:
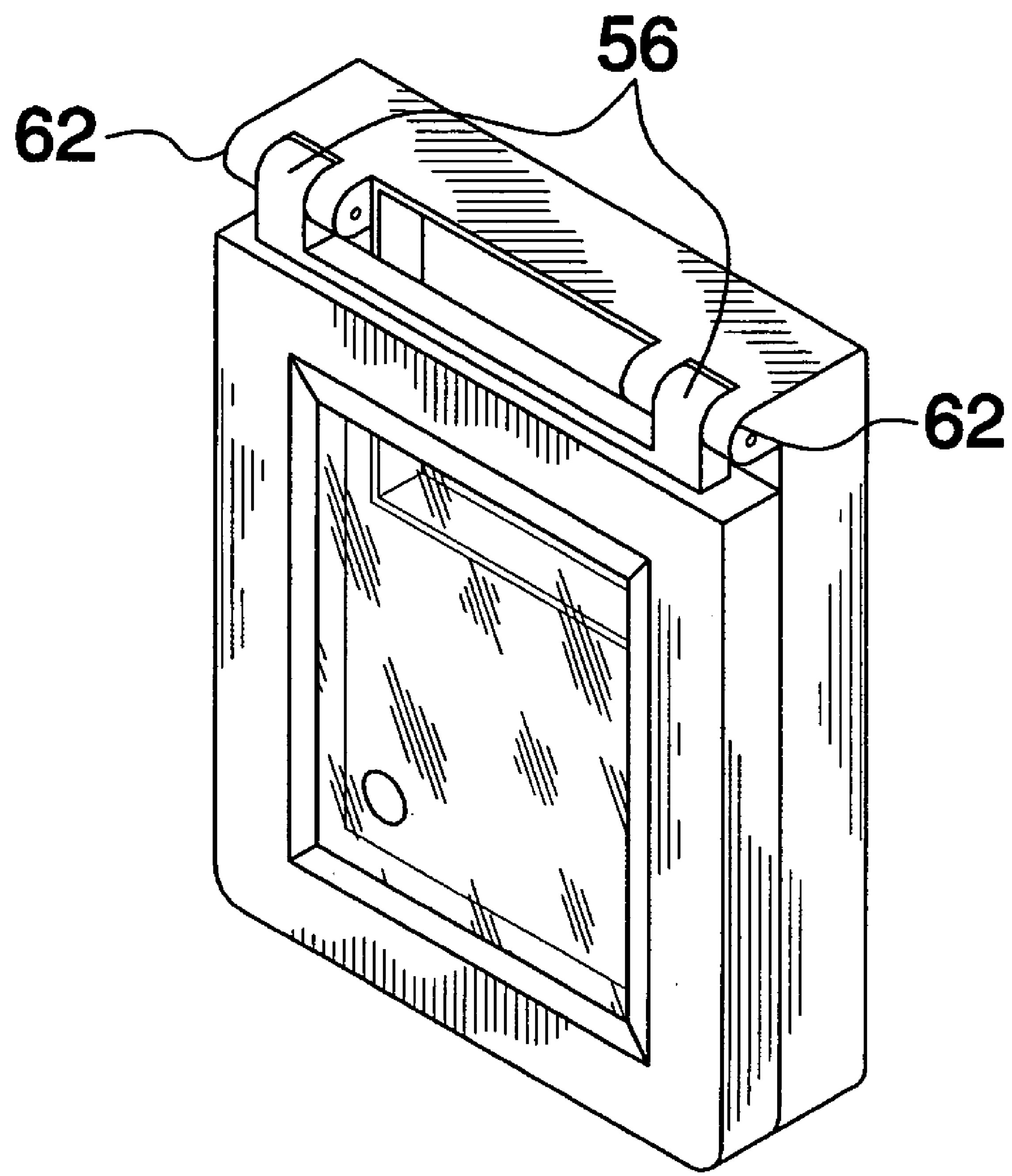
FIG. 3 is a perspective view of the present invention.
Figure 4:
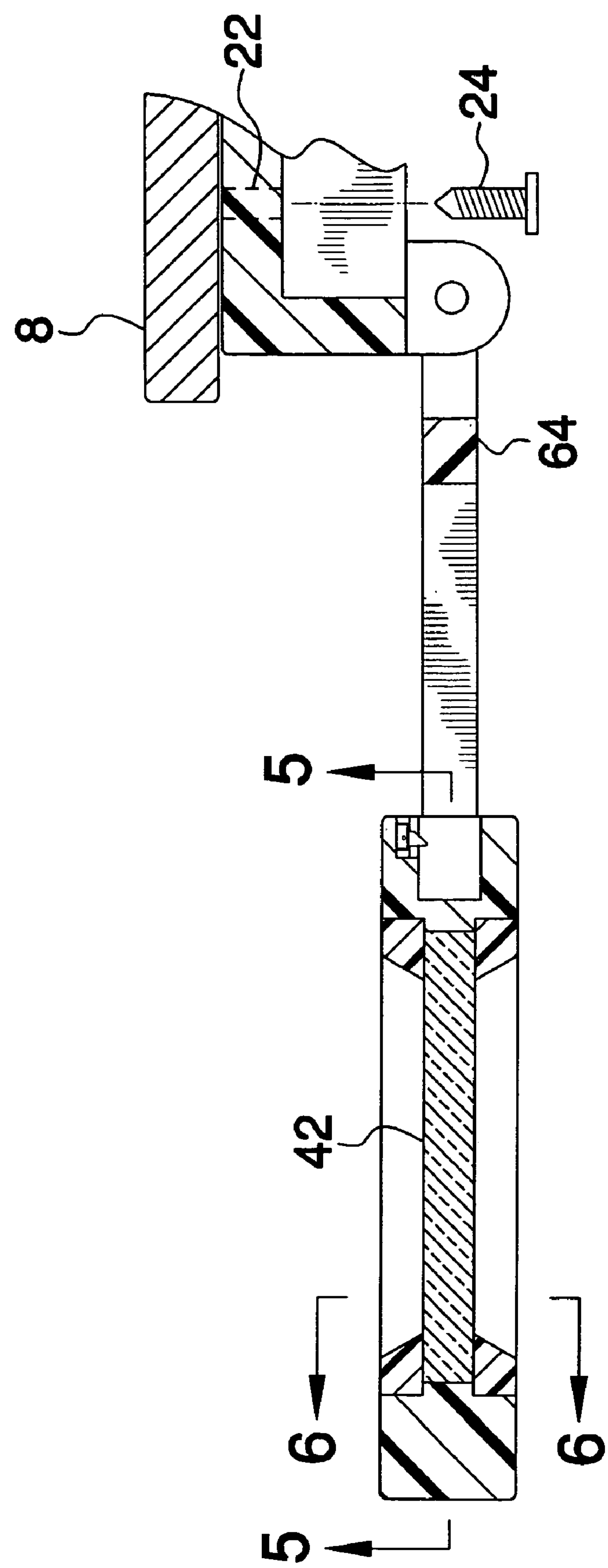
FIG. 4 is a cross-sectional view taken along line 4—4 of FIG. 2 of the present invention.
Figure 5:
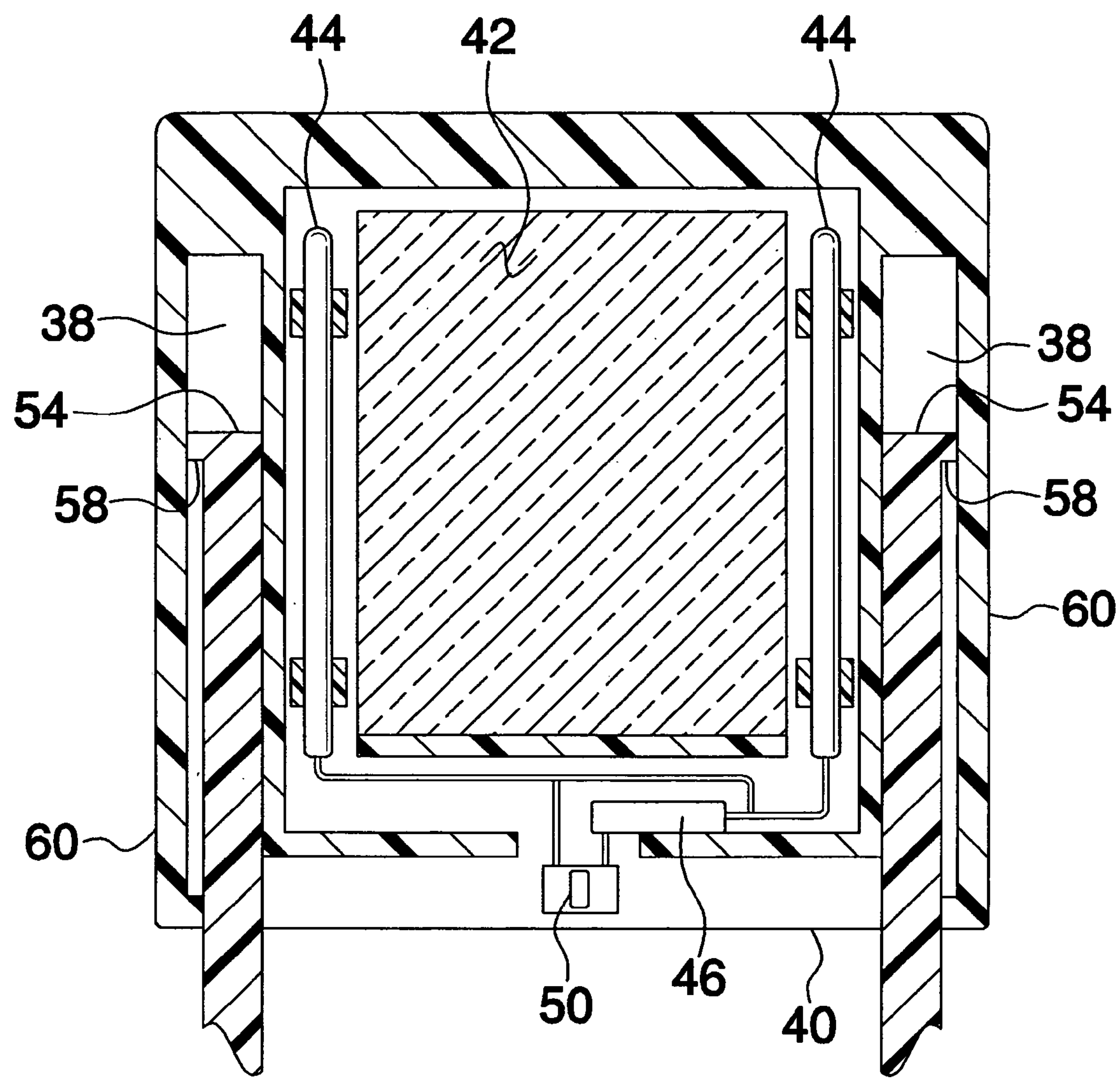
FIG. 5 is a cross-sectional view taken along line 5—5 of FIG. 4 of the present invention.
Figure 6:
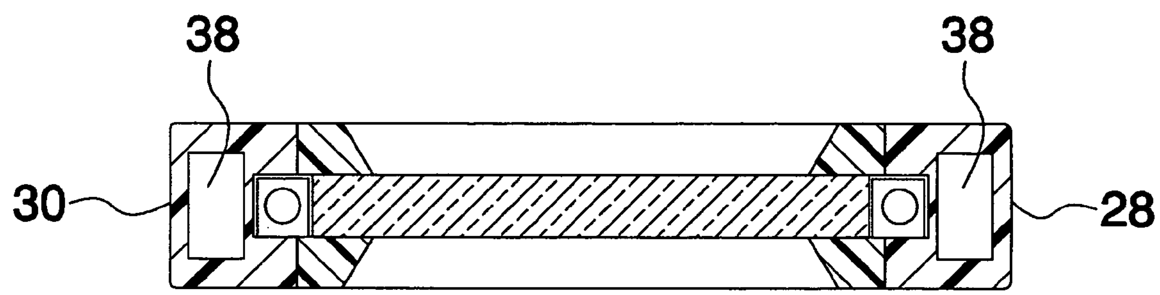
FIG. 6 is a cross-sectional view taken along line 6—6 of FIG. 4 of the present invention.

With reference now to the drawings, and in particular to FIGS. 1 through 6 thereof, a new magnifying device embodying the principles and concepts of the present invention and generally designated by the reference numeral 10 will be described.

As best illustrated in FIGS. 1 through 6, the magnifying assembly 10 generally comprises a plate 12 that has a first side 14, a second side 16, a first end 18 and a second end 20. The plate 12 has a plurality of apertures 22 extending therethrough. Each of a plurality of fasteners 24 is removably extendable through one of the apertures 22 and into a planar surface 8. The planar surface 8 may be a countertop, bottom of a cabinet or a wall surface.

A panel 26 has a first edge 28, a second edge 30, a third edge 32 and a fourth edge 34 wherein the first 28 and second 30 edges are positioned opposite with respect to each other. The panel 26 has a centrally disposed window 36 extending therethrough. Each of a pair of wells 38 extends into the third edge 32. Each of the wells 38 is positioned adjacent to and extends along one of the first 28 and second 30 edges. The third edge 32 has a notch 40 extending therein, which extends between and into each of the wells 38. A magnifying lens 42 is mounted to a peripheral edge of the window 36.

A light emitter 44 is mounted in the panel 26 and is positioned adjacent to the lens 42 so that light emitted by the light emitter 44 passes into the lens 42. Preferably, the light emitter 44 includes a pair of light bulbs that are elongate and each extends along opposite edges of the magnifying lens 42. A power supply 46 is electrically coupled to the light emitter 44. The power supply 46 preferably comprises a battery that mounted in the panel 26 and which may be removed through a door in the panel 26. A switch 50 is electrically coupled to the power supply 46 for selectively turning the light emitter 44 on or off. The switch 50 is mounted in the notch 40 and is preferably retained in an on position unless depressed to an off position.

Each of a pair of arms 52 has an inner end 54 and an outer end 56. The inner ends 54 are each positioned within one of the wells 38. The inner ends 54 are each selectively positionable adjacent to a back wall of the wells 38 to define a stored position or adjacent to the notch 40 to define an extended position. Each of a pair of first stops 58 is attached to one of the inner ends 54. Each of a pair of second stops 60 is attached to the third edge 32. The first stops 58 are abuttable against the second stops 60 when the arms 52 are in the extended position so that each of the inner ends 54 is retained within the wells 38. Each of the outer ends 56 of the arms 52 is hingedly coupled to the first end 18 of the plate 12 by a pair of hinges 62. The panel 26 is selectively abuttable against the plate 12 when the arms 52 are in the stored position.

An actuator 64 is attached to and extends between the arms 52. The actuator 64 is positioned nearer to the outer ends 56 than the inner ends 64. The actuator 64 is positionable in the notch 40 when the arms 52 are in the stored position. The actuator 64 positions the switch 50 in an off position when the arms 52 are in the stored position. The switch 50 is positioned in an on position when the actuator 64 is removed from the notch 40. This ensures that the light emitter 44 is only turned on when the magnifying lens 42 is pulled away from the plate 12.

In use, the magnifying lens 42 is selectively pivoted and extended outwardly away from the plate 12. The lens 42 is then positioned over an object a person wishes to magnify, such as a prescription label or other printed material. The light illuminates the area around the lens 42 to aid in this endeavor. When finished, the arms 52 are extended back into the panel 26 and the panel 26 folded against the plate 12. The arms 52 are of such a size that friction is increased between the arms 5 and the inner surface of the wells 38 to aid in retaining the arms 38 in the stored position. The hinges 62 are preferably of a sufficient tightness to retain the panel 26 against the plate 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A magnifying glass assembly for removably mounting to a planar surface, said assembly comprising:

a plate including a first side, a second side, a first end and a second end, said plate being removably mountable to the planar surface;

a panel having a first edge, a second edge, a third edge and a fourth edge wherein said first and second edges are positioned opposite with respect to each other, said panel having a centrally disposed window extending therethrough, a pair of wells extending into said third edge, each of said wells being positioned adjacent to and extending along one of said first and second edges;

a magnifying lens being mounted to a peripheral edge of said window;

a pair of arms, each of said arms having a inner end and an outer end, each of said inner ends being positioned within one of said wells, each of said inner ends being selectively positionable adjacent to a back wall of said wells to define a stored position or adjacent to said third edge to define an extended position, each of said outer ends of said arms being hingedly coupled to said first end of said plate, said panel being selectively abuttable against said plate when said arms are in said stored position, a longitudinal axis of said arms being selectively pivoted outside of a plane orientated parallel to the planar surface such that a plane of said panel is selectively positionable parallel to said planar surface and in a plurality of positions wherein said plane of said panel intersects said planar surface; and wherein said magnifying lens may be selectively pivoted and extended outwardly away from said plate.

2. The assembly according to claim 1, wherein said plate has a plurality of apertures extending therethrough, each of a plurality of fasteners being removably extendable through one of said apertures and into the planar surface.

3. The assembly according to claim 1, further including:

a light emitter being mounted in said panel and being positioned adjacent to said lens such that light emitted by said light emitter passes into said lens;

a power supply being electrically coupled to said light emitter; and a switch being electrically coupled to said power supply for selectively turning said light emitter on or off.

4. The assembly according to claim 3, further including:

said third edge having a notch extending therein, said notch extending between and into each of said wells;

said switch being mounted in said notch; and an actuator being attached to and extending between said arms, said actuator being positioned nearer to said outer ends than said inner ends, said actuator being positionable in said notch when said arms are in said stored position, said actuator positioning said switch in an off position when said arms are in said stored position, said switch being positioned in an on position when said actuator is removed from said notch.

5. The assembly according to claim 3, wherein said power supply comprises a battery mounted in said panel.

6. The assembly according to claim 3, further including a pair of first stops, each of said first stops being attached to one of said inner ends, a pair of second stops, each of said second stops being attached to said third edge, said first stops being abuttable against said second stops when said arms are in said extended position such that each of said inner ends is retained within said wells.

7. The assembly according to claim 1, further including a pair of first stops, each of said first stops being attached to one of said inner ends, a pair of second stops, each of said second stops being attached to said third edge, said first stops being abuttable against said second stops when said arms are in said extended position such that each of said inner ends is retained within said wells.

8. A magnifying glass assembly for removably mounting to a planar surface, said assembly comprising:

a plate including a first side, a second side, a first end and a second end, said plate having a plurality of apertures extending therethrough, each of a plurality of fasteners being removably extendable through one of said apertures and into the planar surface;

a panel having a first edge, a second edge, a third edge and a fourth edge wherein said first and second edges are positioned opposite with respect to each other, said panel having a centrally disposed window extending therethrough, a pair of wells extending into said third edge, each of said wells being positioned adjacent to and extending along one of said first and second edges, said third edge having a notch extending therein, said notch extending between and into each of said wells;

a magnifying lens being mounted to a peripheral edge of said window;

a light emitter being mounted in said panel and being positioned adjacent to said lens such that light emitted by said light emitter passes into said lens;

a power supply being electrically coupled to said light emitter, said power supply comprising a battery mounted in said panel;

a switch being electrically coupled to said power supply for selectively turning said light emitter on or off, said switch being mounted in said notch;

a pair of arms, each of said arms having a inner end and an outer end, each of said inner ends being positioned within one of said wells, each of said inner ends being selectively positionable adjacent to a back wall of said wells to define a stored position or adjacent to said notch to define an extended position, a pair of first stops, each of said first stops being attached to one of said inner ends, a pair of second stops, each of said second stops being attached to said third edge, said first stops being abuttable against said second stops when said arms are in said extended position such that each of said inner ends is retained within said wells, each of said outer ends of said arms being hingedly coupled to said first end of said plate, said panel being selectively abuttable against said plate when said arms are in said stored position, said plate being positioned between and orientated parallel to said panel and the planar surface when said panel abuts said plate, a longitudinal axis of said arms being selectively pivoted outside of a plane orientated parallel to the planar surface such that a plane of said panel is selectively positionable parallel to said planar surface and in a plurality of positions wherein said plane of said panel intersects said planar surface;

an actuator being attached to and extending between said arms, said actuator being positioned nearer to said outer ends than said inner ends, said actuator being positionable in said notch when said arms are in said stored position, said actuator positioning said switch in an off position when said arms are in said stored position, said switch being positioned in an on position when said actuator is removed from said notch; and wherein said magnifying lens may be selectively pivoted and extended outwardly away from said plate.

9. A magnifying glass assembly comprising:

a planar surface, said planar surface being selected from the group consisting of a cabinet bottom, a vertical wall and a countertop;

a plate including a first side, a second side, a first end and a second end, said plate being removably mountable to the planar surface;

a panel having a first edge, a second edge, a third edge and a fourth edge wherein said first and second edges are positioned opposite with respect to each other, said panel having a centrally disposed window extending therethrough, a pair of wells extending into said third edge, each of said wells being positioned adjacent to and extending along one of said first and second edges;

a magnifying lens being mounted to a peripheral edge of said window;

a pair of arms, each of said arms having a inner end and an outer end, each of said inner ends being positioned within one of said wells, each of said inner ends being selectively positionable adjacent to a back wall of said wells to define a stored position or adjacent to said third edge to define an extended position, each of said outer ends of said arms being coupled via a hinge to said first end of said plate, said panel being selectively able to abut against said plate when said arms are in said stored position, said plate being positioned between and orientated parallel to said panel and the planar surface when said panel is abutted against said plate; and wherein said magnifying lens may be selectively pivoted and extended outwardly away from said plate.

10. The assembly according to claim 9, wherein said plate has a plurality of apertures extending therethrough, each of a plurality of fasteners being removably extendable through one of said apertures and into the planar surface.

11. The assembly according to claim 9, further including:

a light emitter being mounted in said panel and being positioned adjacent to said lens such that light emitted by said light emitter passes into said lens;

a power supply being electrically coupled to said light emitter; and a switch being electrically coupled to said power supply for selectively turning said light emitter on or off.

12. The assembly according to claim 11, further including:

said third edge having a notch extending therein, said notch extending between and into each of said wells;

said switch being mounted in said notch; and an actuator being attached to and extending between said arms, said actuator being positioned nearer to said outer ends than said inner ends, said actuator being positionable in said notch when said arms are in said stored position, said actuator positioning said switch in an off position when said arms are in said stored position, said switch being positioned in an on position when said actuator is removed from said notch.

13. The assembly according to claim 11, wherein said power supply comprises a battery mounted in said panel.

14. The assembly according to claim 11, further including a pair of first stops, each of said first stops being attached to one of said inner ends, a pair of second stops, each of said second stops being attached to said third edge, said first stops being able to be abut against said second stops when said arms are in said extended position such that each of said inner ends is retained within said wells.

15. The assembly according to claim 9, further including a pair of first stops, each of said first stops being attached to one of said inner ends, a pair of second stops, each of said second stops being attached to said third edge, said first stops being able to abut against said second stops when said arms are in said extended position such that each of said inner ends is retained within said wells.

* * * * *